United States Patent [19]

Erickson

[11] 4,286,871
[45] Sep. 1, 1981

[54] PHOTOGRAMMETRIC MEASURING SYSTEM

[75] Inventor: Kent E. Erickson, Brookside, N.J.

[73] Assignee: Keuffel & Esser Company, Morristown, N.J.

[21] Appl. No.: 176,886

[22] Filed: Aug. 11, 1980

[51] Int. Cl.³ .................... G03B 27/00; G01B 11/14; H01J 3/14
[52] U.S. Cl. ................. 355/133; 250/237 G; 356/374
[58] Field of Search ............ 33/20 D; 250/237; 356/373, 374; 354/354; 355/125, 132, 133; 430/5; 156/651

[56] References Cited

U.S. PATENT DOCUMENTS

| | | | |
|---|---|---|---|
| 3,116,555 | 1/1964 | Helava | 33/20 D |
| 3,330,964 | 7/1967 | Hobrough et al. | 250/237 |
| 3,482,107 | 12/1969 | Hock | 356/373 X |
| 3,729,830 | 5/1973 | Blachut et al. | 33/20 D |
| 3,768,911 | 10/1973 | Erickson | 356/374 |
| 3,796,498 | 3/1974 | Post | 250/237 G X |
| 3,839,039 | 10/1974 | Suzuki et al. | 354/354 X |
| 3,873,203 | 3/1975 | Stevenson | 355/133 |
| 3,877,810 | 4/1975 | Feldstein | 355/133 |
| 4,176,276 | 11/1979 | Kaul et al. | 250/237 G |

Primary Examiner—Donald A. Griffin
Attorney, Agent, or Firm—Lionel N. White

[57] ABSTRACT

An electro-optical measuring system in a photogrammetric comparator or stereocompiler comprises a visible light transparent phase grating which is carried upon a surface of the photo support plate of the device. The grating is formed as a composite layer of $\lambda/4$ films of at least two dielectric materials of different refractive index which are deposited on the support in such a manner as to yield parallel bands in which the two film materials are in alternating sequence from band to band. As a result of this structure which ensures a constant physical and optical thickness with respect to transmitted imaging light over the whole granting pattern, image-degrading diffraction of the transmitted visible light is avoided, yet the grating pattern provides interfering diffraction in reflection which may be utilized in a precise displacement measuring system.

9 Claims, 4 Drawing Figures

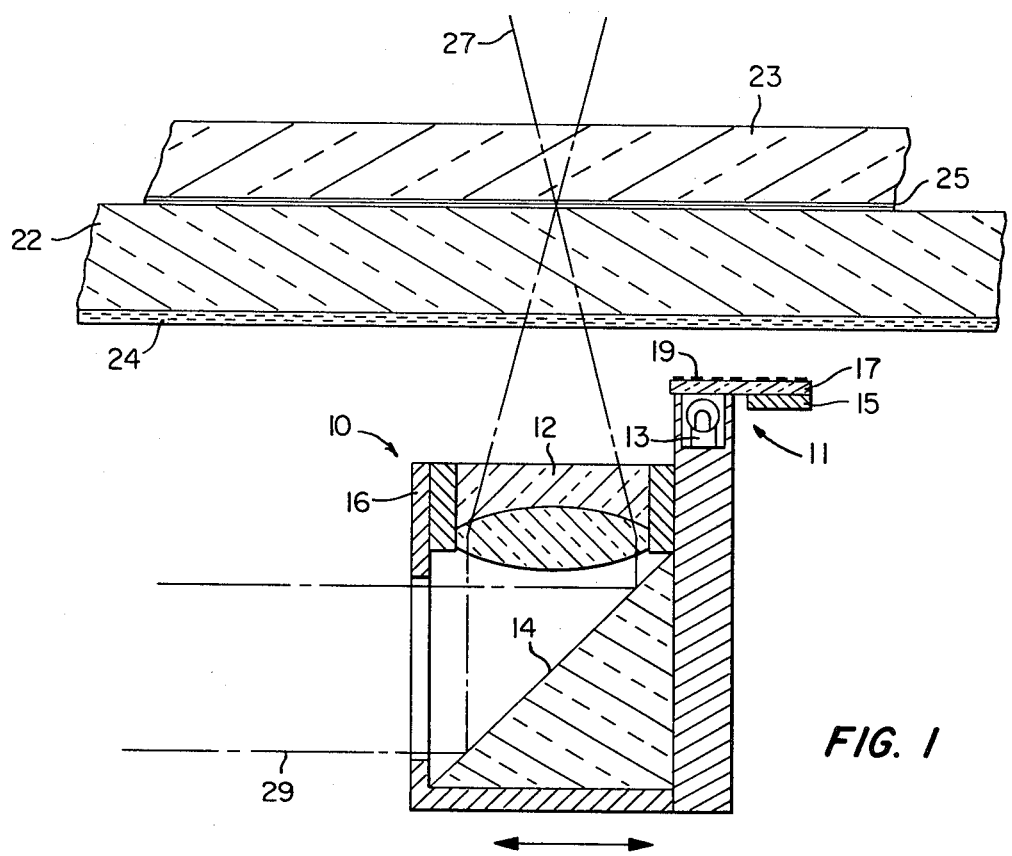
FIG. 1
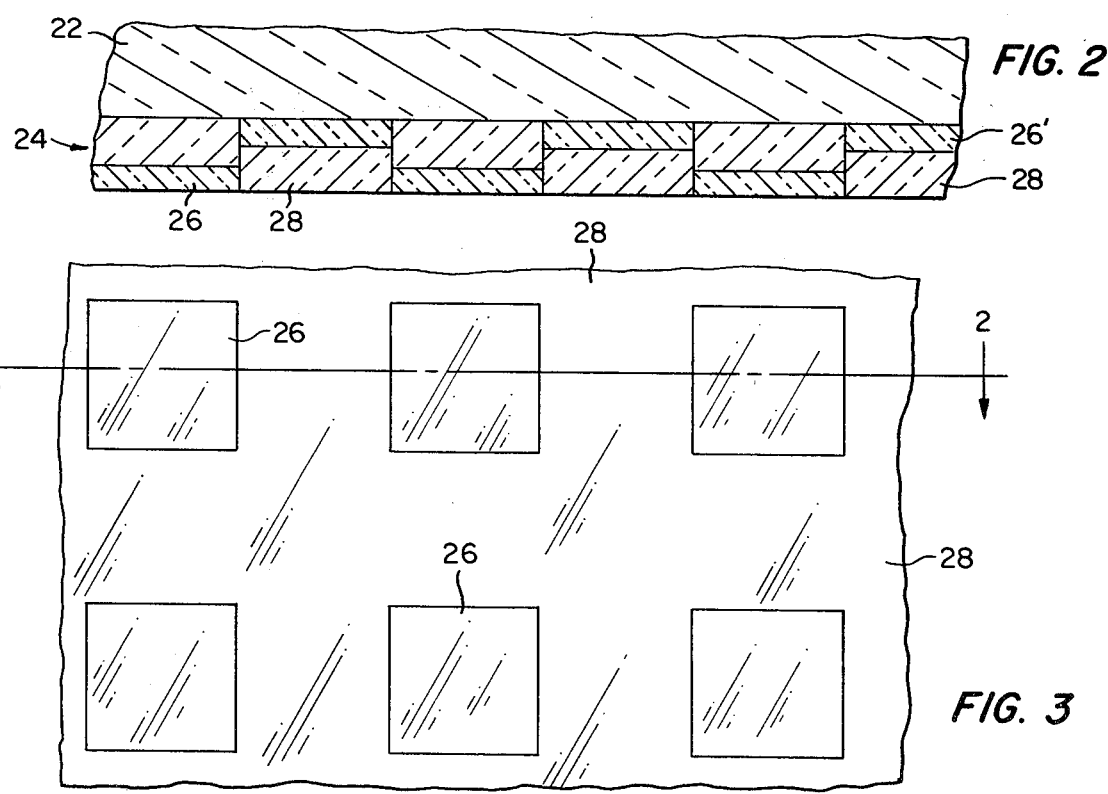
FIG. 2
FIG. 3

PHOTOGRAMMETRIC MEASURING SYSTEM

BACKGROUND

In the field of optical metrology, particularly in the area of photogrammetry, practical systems are dependent upon the precison with which measurement may be made of relative locations of points on a subject under observation. It is essential, for example, that features on an aerial photograph of a land mass be precisely located with respect to established datum points in order that basic orientation parameters may be calculated in the process of constructing terrain stereo models.

Devices such as mono- and stereocomparators, which are employed to dimension coordinates of reference terrain features, and stereocompilers, which yield stereoscopic terrain views from analyses of such coordinate dimensions, rely for their utility on the accuracy with which displacement in subject photographs may be measured. These instruments are substantially similar in that they comprise means for mounting a photographic transparency for viewing with optical means while effecting relative displacement between the viewing optics and the photograph, as well as means for measuring such displacement. Of these elements the measuring means have consistently been the most critical and have presented the greatest difficulties to realizing necessary accuracies.

In their simplest form these devices consist essentially of a stationary base upon which is supported a first platform or stage constrained for movement along a first horizontal axis, the first stage supporting a second constrained for movement along the orthogonal horizontal axis, and the second stage supporting the photograph to be examined. A microscope affixed to the base and supported in a stationary position above the diapositive photograph plate includes a reticle which establishes the reference datum while the terrain features in the photo are being observed in light transmitted through the plate. Index marks on the base and first stage are employed in conjunction with respective graduated scales extending along the orthogonal displacement axes on the first and second stages to establish the coordinates of terrain features and the extent of photo displacement with respect to the reference reticle.

From these simple beginnings, photogrammetric instruments have been improved in measuring accuracy by the introduction of lead screw or other precise displacement mechanisms, and electro-mechanical measuring devices, such as angle encoders. Such features are suggested, for example, in U.S. Pat. No. 3,116,555. The problems of achieving requisite accuracy persisted, however, due to the mechanical tolerances intervening between the photograph and the ultimate measuring element.

With each linkage or interface in such a mechanical train providing a source of measuring error, efforts were made to more closely associate the displacement measuring means with the photo itself in order to eliminate the discrepancies inherent in available systems. To this end arrangements such as suggested in U.S. Pat. No. 3,330,964 provided electro-optic coordinate measuring scales which were an integral part of a single stage support by means of which the photo/scales combination could be displaced as a unit with respect to the stationary combination of viewing optics and scale-reading sensors.

Although a significant improvement, such a system suffered from the excessive offset between the viewing line of sight and the measuring elements necessitated by the requirement for an unobstructed light path over the whole area of the photographic transparency. The resulting extended moment arm between photo reference point and measuring means led to torsional displacement errors which could not be tolerated in precise photogrammetric operations. The system had the disadvantage also of requiring a working surface of sufficiently large area to accommodate the scale elements as well as the subject photograph.

Some improvements in measuring accuracy and equipment size reduction were realized with systems such as described in U.S. Pat. No. 3,729,830 which arranged the photo and biaxial scale grid generally in line with the viewing line of sight. The persistent requirement for lack of obstruction in the viewing path resulted, however, in the separation of the scale and photo elements. This in turn limited the utility of such an arrangement due to the need for maintaining critical parallelism between the photographic plate and the scale grid across distances sufficient to accommodate elements of the viewing optics in the intervening space, and for providing an unerring mechanical system for coupling the photo displacement to that of the scale sensors.

In an attempt to optimize these systems with respect to both size and stability, consideration has been given to incorporating the biaxial scale grid into the transparent photo support plate and to physically associating displaceable viewing optics with the sensors of the measuring system. In this manner the device need be only as expansive as the subject photo, since the optics would be capable of moving to any feature to be examined. Further, the displacement sensors would be closely adjacent to the line of sight, thereby substantially eliminating the disruptive mechanical offsets of earlier systems.

A major obstacle to the utility of such an arrangement remained, however; namely, the presence of the scale grid in the path of image-bearing light as a result of situating the sensor/optics couple close to the grid surface of the photo support plate. The problem which this creates arises from the fact that any previously available scale grid structure, whether amplitude or phase grating type, imposes a diffractive element in the viewing line of sight which significantly degrades the image of photographic features under examination. In addition to diffraction, these gratings often cause an attenuation of the image beam which renders the system of little practical use.

The present invention alleviates this problem by providing a phase grating type grid structure which yields an electro-optically sensible scale, yet causes no deleterious diffraction of transmitted visible light. Unlike the amplitude grating described in U.S. Pat. No. 3,768,911 or the phase grating of U.S. Pat. No. 3,482,107, the grating of this invention presents no differences in optical thickness with respect to normally-incident transmitted light and thus avoids creating diffraction of such image-bearing light. On the other hand, the incident light of a sensing system, such as shown in the noted U.S. Pat. No. 3,768,911, is sufficiently diffracted in reflection to generate the fringe pattern which forms the basis for that precise electro-optical measuring system.

SUMMARY

In accordance with the present invention a transparent photo support is provided with a grating pattern which comprises alternating bands, or lines, of composite layers of at least two materials having different indices of refraction. The two selected materials are deposited on one side of the support plate in substantially equal optical thicknesses of λ/4 with the sequence of deposition of each material being reversed in the alternate band layers. In this manner the optical thicknesses of the composite band layers are made substantially equal and a uniform physical thickness is maintained over the whole of the grating area.

As a result of this grating structure there is no significant diffraction of transmitted light; therefore, a photo mounted on the plate may be viewed through the grating without loss of image detail. Despite the overall transparency of the grating plate, however, the surface of an individual layer, particularly that of the higher index material, is sufficiently reflective of incident light to provide a return beam which may be sensed by a photoelectric detector.

The noted sequence of deposition of the layer materials causes the reflective layer surfaces to be situated at levels which differ by λ/4 in the two sets of alternate bands, thereby causing a λ/2 phase shift between portions of detector light reflected from the respective bands with resulting interference between those phase-displaced beam segments creating the typical moire' fringe pattern.

The phase grating thus deposited on the photo support plate may be utilized in combination with a reticle grating element to provide a displacement measuring system such as generally disclosed in U.S. Pat. No. 3,768,911. In such an application the reticle, light source, and detector elements of the system are closely associated with the photo-viewing optics of a photogrammetric comparator or compiler and are arranged for movement therewith adjacent to the grating of the support plate. The advantage of substantially eliminating an offset between viewing and measuring elements is thereby realized, yet the photo support grating, being devoid in transmission of any diffracting elements, does not degrade the photo image viewed through the support and grating.

In operation, light from the uniform, or omnidirectional, source is transmitted through the primary amplitude grating reticle pattern to incidence upon the support phase grating where it is diffracted in reflection with the noted phase shift and formation of fringes in the reflected light which is then transmitted through the remaining reticle grating pattern onto the photoelectric detectors. Relative movement between the reticle grating pattern and that of the photo support effects displacement of the fringe pattern at the reticle with resulting variation in the intensity of light transmitted to the detectors.

A vacuum deposition process, described below, is employed to construct the phase grating of the present invention. The pair of thin film dielectric materials used to form the functional composite grating layer are selected, respectively, from higher (2.2-2.7) refractive index compounds such as cerium oxide, titanium dioxide, thorium dioxide, zinc sulfide, and zicronium dioxide; and lower (1.3-1.5) index materials such as magnesium fluoride, calcium fluoride, cryolit, lithium fluoride, and silica, and are deposited in respective thickness of λ/4 at about 850 nm, the effective operating wavelength of the incandescent light source employed in a preferred measuring system. Since the higher index film material apparently has the greater effect on the reflective phase shift of the composite grating layer, it is particularly desirable that the λ/4 thickness of the lower index film material be maintained in order to ensure an optimum λ/2 phase shift in the reflected beam. Th maintenance of equality, at least to within 15%, in the respective thicknesses of like film materials throughout the composite layer of the grating is also desirable in order to ensure an inconsequential degree of transmission diffraction of photo illumination.

An effective transparent phase grating for use in a photogrammetric comparator or compiler can be obtained with a composite layer having the dielectric materials deposited in line widths of about 20 μm each to provide a grating period of about 40 μm. Utilizing a reticle pattern of similar periodicity in the noted sensitivity-doubling reflective system, measurement precision of about 1 μm may readily be obtained with available detector and resolver electronics. The phase grating of the present invention provides an additional advantage in that its high degree of transparency allows for the deposition of a pair of orthogonal grating patterns on the photo support plate to provide a biaxial measuring grid without attenuating the photo-viewing illumination to any significant degree. With such a biaxial grid, a second pick-up head, comprising light source, reticle, and detectors, associated with the displaceable viewing optics provides means for directly establishing the coordinates of any feature in the photo under observation.

DRAWINGS

In the accompanying drawings:

FIG. 1 is an elevational view, in section, depicting schematically the elements of a measuring system according to the present invention;

FIG. 2 is an elevational view, in section along the line 2—2 of FIG. 3, of a portion of the photo support plate of FIG. 1 showing the structure of the composite phase grating layer according to the present invention;

FIG. 3 is a plan view of the portion of the phase grating layer; and

Figure 4:
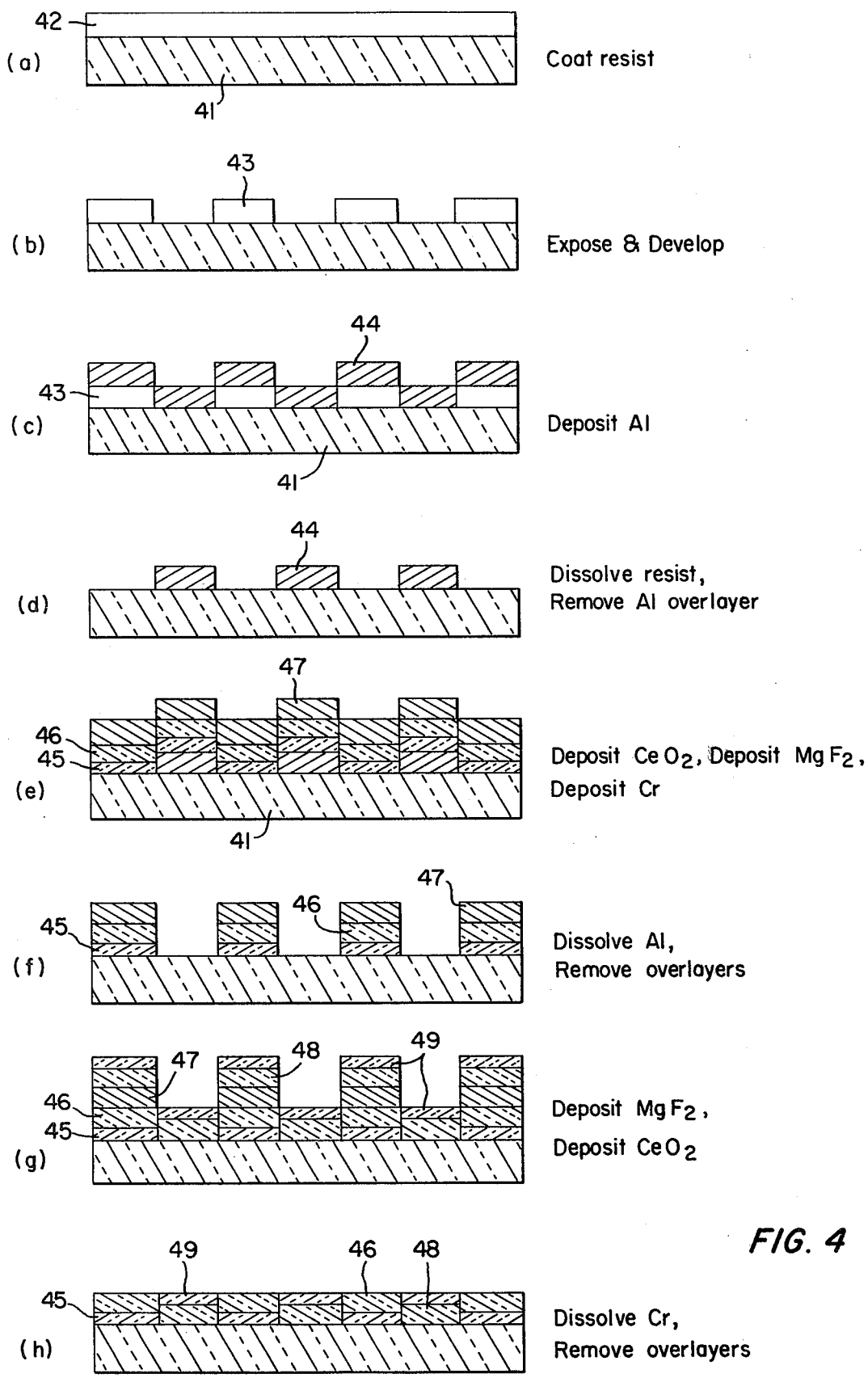

FIG. 4 (a to h) presents a series of elevational section views of a photo support plate depicting the process steps utilized in the preparation of a preferred phase grating structure according to the present invention.

DESCRIPTION

A preferred embodiment of a measuring system utilizing a transparent phase grating according to the present invention is schematically represented in FIG. 1. As shown, the syetem includes a photo support comprising a transparent glass plate 22 bearing the phase grating layer 24 to be described below in greater detail. A diapositive photo, typically an aerial view of terrain features, comprising a glass plate 23 and a developed photographic emulsion layer 25 is supported upon plate 22 during examination.

Viewing optics, shown generally at 10, are situated closely adjacent support plate 22 and arranged for movement along one coordinate axis, as depicted by the double arrow, in a direction substantially perpendicular to the lines of the grating pattern 24. In the present embodiment this grating scale includes orthogonal pattern lines, as shown in part in FIG. 3, and the viewing optics structure 10 is arranged to move also along the orthogonal coordinate axis in the direction perpendicular to the plane of FIG. 1. In this manner both cartesian coordinates of the terrain features under examination may be determined.

The displaceable viewing optics of the present embodiment are simply shown in FIG. 1 as a body 16 in which are supported a collimating lens system 12 and a reflective prism surface 14. Imaging illumination from a light source, not shown, is incident upon a photograph 25 in beam 27 and is subsequently transmitted by support plate 22 and grating pattern 24 for collimation by lens 12 and reflection from surface 14 along beam 29 to additional imaging optics, not shown, which carry the photo image to the eyepiece of the comparator or compiler device.

Closely associated with viewing optics 10 is displacement detector head 11 which comprises a light source 13 and a reticle plate 17 to which is affixed a photoelectric sensor 15. In accordance with the measuring system generally described above and discussed in greater detail in U.S. Pat. No. 3,768,911, the diffuse illumination from source 13 is transmitted through the amplitude grating pattern 19 of reticle plate 17 to be reflected from the phase grating layer 24 of support plate 22 and retransmitted through the complementary amplitude grating pattern of plate 17 to incidence upon sensor 15 with varying intensity according to the displacement of viewing means 10 and detector head 11 with respect to phase grating pattern 24. Reticle grating pattern 19 is disposed substantially parallel to the deposited lines of one coordinate axis of phase grating pattern 24. Although not depicted, it will be understood that a second detector head identical to that shown at 11 is likewise carried by viewing optics 10 with the reticle pattern extending in the orthogonal direction to parallel that additional axis of the phase grating pattern.

The structure of the transparent phase grating layer 24 of the present embodiment is shown in greater detail in FIG. 2 and comprises multiple interleaved thin films of dielectric materials coated upon the photo support plate 22. In this embodiment these film materials are cerium oxide 26 and magnesium fluoride 28. Each of these materials is coated on the support plate by means of a conventional vacuum deposition technique in a procedure more particularly described below. Each film segment is deposited to a thickness of about $\lambda/4$, measured at the average effective wavelength of detector head light source 13, e.g. 850 nm for the incandescent source of present embodiment. As can be seen from FIG. 3, the selected pattern of deposited materials appearing at the face of plate 22 consists of two sets of orthogonally intersecting lines of magnesium fluoride 28 alternating in each coordinate direction with similarly dimensioned isolated squares of cerium oxide 26.

In operation, light from source 13 of detector head 11 is transmitted through grating pattern 19, which is located about 3 mm from the surface of phase grating pattern 24, and is reflected from the first encountered surface of each of the higher refractive index cerium oxide films 26,26' respectively located at levels in the composite layer 24 which differ by the $\lambda/4$ thickness of magnesium fluoride films 28. The respective portions of light reflected from these sets of surfaces are thus phase-displaced by a total of $\lambda/2$ which results in interference between them with formation of the characteristic fringe pattern.

This pattern is then incident upon the remaining sections of reticle grating pattern 19 which effectively shutter the fringe pattern to form the distinctive intensity variation of the light incident upon detector sensor 15. A similar fringe pattern is created in the orthogonally disposed grating patterns of composite layer 24 and the duplicate detector head 11 to likewise provide an indication of viewing optics, or photo, displacement along that axis.

A preferred procedure for the formation of the composite phase grating layer of the present invention is shown graphically in FIG. 4. In step (a), a sheet of 3 mm plate glass 41 is coated to a thickness of about 1 $\mu$m with a layer of a positive-working photo resist 42, e.g. a naphthoquinone diazide commercially available as Kodak Micro Positive Resist 809. This coating is prepared in the usual manner as suggested by the manufacturer, and in step (b) is contact exposed under a master for about 25 minutes to the light of a 125 watt photoflood lamp from a distance of about 1.5 meters and developed in a commercial alkaline developer solution to effect removal of light-exposed areas of the coating and yield a resist pattern 43 duplicating the master. In this operation the master employed comprises two sets of orthogonally disposed parallel opaque lines of about 20 $\mu$m width.

As represented in step (c), a layer of aluminum 44 is vacuum deposited, according to usual techniques, at ambient temperature to a thickness of about 1 $\mu$m on the resist pattern 43 and the exposed surface areas of support plate 41. The resist pattern is then stripped by solution in acetone with accompanying removal of the overlaying pattern of aluminum to yield, in step (d), the pattern 44 of aluminum corresponding to the light-exposed areas of the original resist.

Upon the aluminum pattern and bared glass surface there is coated by vacuum deposition a $\lambda/4$ (at 850 nm) layer of cerium oxide 45, and upon that layer a $\lambda/4$ layer of magnesium fluoride 46. During these depositions normal care is taken to maintain constant elevated coating temperatures to ensure precise indices of refraction in the finished composite layer. After cooling of plate 41 and deposited $CeO_2$ and $MgF_2$ layers, a chromium layer 47 of about 1 $\mu$m thickness is vacuum deposited at ambient temperature (FIG. 4(e) ).

The coated plate is then immersed in a caustic bath of about 10% NaOH in which the remaining aluminum deposition is dissolved and removed from plate 41 along with the layers subsequently deposited thereon to yield the pattern of composite layers of $CeO_2$ 45, $MgF_2$ 46, and Cr 47, as depicted in step (f). Utilizing the previous vacuum deposition techniques $\lambda/4$ layers of $MgF_2$ 48 and $CeO_2$ 49 are coated in turn upon the chromium and exposed glass surfaces as shown in step (g).

The coated plate is then immersed in a chromium etching solution, e.g. acidic ceric ammonium nitrate, to dissolve the chromium pattern layer and effect its removal with the overlayers of $MgF_2$ and $CeO_2$. The resulting coated plate is then washed and dried to yield the finished photo support shown in step (h) in which the composite phase grating layer comprises alternating bands, or lines, of $MgF_2/CeO_2$ 46,45 and $CeO_2/MgF_2$ 49,48.

In a minor variation of the process depicted in FIG. 4, the initial aluminum layer pattern 44 of step (d) may be obtained by first depositing a continuous layer of the aluminum on plate 41 and thereupon coating a resist layer 42 with subsequent exposure and development followed by etching of the aluminum and stripping of the remaining resist. The aluminum pattern may then be utilized in the following steps (e)–(h) shown in FIG. 4 with similar results.

As previously noted, other higher refractive index dielectric materials may be substituted for the $CeO_2$, while the lower refractive index $MgF_2$ may be replaced by dielectric materials of refractive indices in the comparable range. A further variation to improve the signal response in the measuring system comprises the intial coating upon plate 41 of an anti-reflection layer, such as a $\lambda/4$ layer of $MgF_2$ (at 550 nm). This anti-reflection acts to isolate the composite phase grating layer 24 from support 22 with respect to visible light and effectively reduces transmission diffraction as well as reflections from the surface of the support plate which might otherwise interfere with and cause deleterious effect upon the measuring fringe pattern.

What is claimed is:

1. An electro-optic measuring system comprising:
   (a) a light source;
   (b) a first reticle grating pattern situated in the light from said source;
   (c) a reflective phase grating pattern situated in the light transmitted by said reticle grating pattern, said grating patterns being substantially parallel and arranged for relative movement therebetween in the direction of the period of said patterns;
   (d) a second reticle grating pattern situated substantially equidistant with said first reticle pattern from said phase grating pattern and in the light reflected therefrom; and
   (e) photoelectric means arranged in the light transmitted by said second reticle grating pattern and providing a varying electrical signal in response to the fluctuation in light intensity resulting from said relative movement.

2. A measuring system according to claim 1 wherein said phase grating comprises:
   (a) a plane-surfaced support; and
   (b) a layer deposited on said support surface comprising alternate, contiguous elongate bands of substantially equal width and optical thickness of two film materials having significantly different refractive indices.

3. A measuring system according to claim 1 wherein said phase grating comprises:
   (a) a plane-surfaced transparent support;
   (b) a first layer deposited on said support surface comprising alternate, contiguous elongate bands of substantially equal width and optical thickness of two transparent film materials having significantly different refractive indices;
   (c) a second layer deposited on said first layer comprising alternate, contiguous bands of substantially equal optical thickness of said film materials, each of the lower and higher index materials of said second layer being deposited on and coextensive with the higher and lower index materials, respectively, of said first layer, whereby the upper surface of said phase grating is substantially parallel to said support surface.

4. A measuring system according to claim 3 wherein a uniform layer of an anti-reflection material is interposed between said support surface and said first layer.

5. A measuring system according to claim 3 wherein each of said bands of film material are deposited to a thickness of about $\lambda/4$ of the effective average wavelength of the illumination from said light source.

6. A measuring system according to claim 1 wherein said phase grating comprises:
   (a) a plane-surfaced support; and
   (b) deposited on said surface, a composite layer wherein a regular period grating pattern is reproduced in a first layer of reflecting material, the surface of which layer is offset from said support surface by a difference of about $\lambda/4$ from that of a second, complementary pattern layer of said material, thereby to yield in light reflected therefrom a phase difference of about $\lambda/2$ according to said pattern.

7. A measuring system according to claim 6 wherein said support is transparent, and said composite layer is of substantially uniform thickness and comprises pattern layers of light transmissive dielectric material.

8. The method of making a reflective phase grating which comprises:
   (a) providing a plane-surfaced transparent support;
   (b) forming on the plane surface of said support a regular period grating pattern of a first material which exhibits substantial solubility in a first liquid;
   (c) depositing over the whole of said patterned support surface to a thickness of about $\lambda/4$ a layer of a second material consisting essentially of a dielectric having a given index of refraction, said second material exhibiting no substantial solubility in said first liquid;
   (d) depositing over the whole of said second material layer to a thickness of about $\lambda/4$ a layer of a third material consisting essentially of a dielectric having an index of refraction significantly different from that of said second material, said third material exhibiting no substantial solubility in said first liquid;
   (e) depositing over the whole of said third material layer a layer of a fourth material which exhibits no substantial solubility in said first liquid, but exhibits substantial solubility in a second liquid in which said second and third materials exhibit no substantial solubility;
   (f) applying said first liquid to the resulting layered support, thereby dissolving said pattern of first material and effecting removal thereof from said support with overlying, coextensive portions of said deposited layers of second, third, and fourth materials;
   (g) depositing over the whole of the resulting patterned support surface a $\lambda/4$ layer of said third material;
   (h) depositing over the whole of said third material layer a $\lambda/4$ layer of said second material;
   (i) applying said second liquid to the resulting layered support, thereby dissolving the remaining portions of said fourth material layer and effecting removal thereof from said support with overlying, coextensive portions of the subsequently deposited layers of said second and third materials;

whereby said support is provided with a composite layer of substantially uniform thickness wherein said regular period pattern is reproduced in a first layer of dielectric material the reflecting surface of which is offset from said support surface by a difference of about $\lambda/4$ from that of a second, complementary pattern layer of the same dielectric material, thereby to yield in light reflected therefrom a phase difference of about $\lambda/2$ according to said pattern.

9. The method according to claim 8 wherein:
   (a) said first material is aluminum;
   (b) said second material is cerium oxide;
   (c) said third material is magnesium fluoride; and
   (d) said fourth material is chromium.

* * * * *